United States Patent
Augustin et al.

(10) Patent No.: US 10,597,104 B2
(45) Date of Patent: Mar. 24, 2020

(54) SCOOTER WITH FOOT REST ARRANGEMENT

(71) Applicant: Bayerische Motoren Werke Aktiengesellschaft, Munich (DE)

(72) Inventors: Stephan Augustin, Munich (DE); Ernst Gruenwald, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/386,814

(22) Filed: Apr. 17, 2019

(65) Prior Publication Data

US 2019/0241227 A1  Aug. 8, 2019

Related U.S. Application Data

(63) Continuation of application No. PCT/EP2017/071835, filed on Aug. 31, 2017.

(30) Foreign Application Priority Data

Oct. 18, 2016 (DE) .................. 10 2016 220 383

(51) Int. Cl.
*B62J 25/00* (2020.01)
*B62J 27/00* (2020.01)
*B62K 21/18* (2006.01)

(52) U.S. Cl.
CPC .............. *B62J 25/00* (2013.01); *B62J 27/00* (2013.01); *B62K 21/18* (2013.01); *B62K 2202/00* (2013.01)

(58) Field of Classification Search
CPC .............................. B62J 25/00; Y10T 74/20918
(Continued)

(56) References Cited

U.S. PATENT DOCUMENTS 3,511,520 A * 5/1970 Dunlap ................. A63G 19/16
                                                        280/219
3,620,547 A * 11/1971 Vaverek ................. B62K 3/002
                                                        280/87.042
(Continued)

FOREIGN PATENT DOCUMENTS

CN  103 481 995 A  1/2014
DE  196 29 879 A1  1/1998
(Continued)

OTHER PUBLICATIONS

International Search Report (PCT/ISA/210) issued in PCT Application No. PCT/EP2017/071835 dated Nov. 8, 2017 with English translation (four (4) pages).
(Continued)

*Primary Examiner* — Tony H Winner
(74) *Attorney, Agent, or Firm* — Crowell & Moring LLP

(57) ABSTRACT

A scooter has a foot rest arrangement with a left foot rest surface and a right foot rest surface, a steerable front wheel guide mounted in a head tube so as to be rotatable about a first axis of rotation, and a steering column that can be rotated about a second axis of rotation. The steering column and the front wheel guide are spaced apart from each other and are operatively coupled to each other to transfer a steering movement. The second axis of rotation intersects the foot rest arrangement at an intersection point in such a way that the left and right foot rest surfaces are arranged on either side of the intersection point.

14 Claims, 1 Drawing Sheet

(58) Field of Classification Search
USPC .......................................................... 280/291
See application file for complete search history.

(56) References Cited

U.S. PATENT DOCUMENTS

| | | | | |
|---|---|---|---|---|
| 4,203,610 | A * | 5/1980 | Mihalik | B62K 3/002 |
| | | | | 280/87.041 |
| 4,204,698 | A * | 5/1980 | Mihalik | B62K 3/002 |
| | | | | 280/87.041 |
| 4,685,694 | A | 8/1987 | Kouyama | |
| 5,992,862 | A * | 11/1999 | Mitchell | A63C 17/1436 |
| | | | | 188/5 |
| 6,142,253 | A | 11/2000 | Mueller et al. | |
| 6,273,439 | B1 * | 8/2001 | Ray | B62K 3/002 |
| | | | | 280/63 |
| 6,279,929 | B1 * | 8/2001 | Fruechtenicht | B62K 3/002 |
| | | | | 280/263 |
| 9,889,901 | B2 * | 2/2018 | Allais | B62K 3/002 |
| 2002/0121754 | A1 * | 9/2002 | Nall, III | B62K 3/002 |
| | | | | 280/87.021 |
| 2004/0012166 | A1 * | 1/2004 | Reginato | B62K 3/002 |
| | | | | 280/87.041 |
| 2010/0253036 | A1 * | 10/2010 | Liu | B62K 3/10 |
| | | | | 280/210 |

FOREIGN PATENT DOCUMENTS

| | | |
|---|---|---|
| DE | 699 285 94 T2 | 6/2006 |
| EP | 2 347 950 A1 | 7/2011 |
| WO | WO 2014/154295 A1 | 10/2014 |

OTHER PUBLICATIONS

German-language Written Opinion (PCT/ISA/237) issued in PCT Application No. PCT/EP2017/071835 dated Nov. 8, 2017 (five (5) pages).

German-language Search Report issued in counterpart German Application No. 10 2016 220 383.5 dated Aug. 4, 2017 with partial English translation (13 pages).

* cited by examiner

SCOOTER WITH FOOT REST ARRANGEMENT

CROSS REFERENCE TO RELATED APPLICATIONS

This application is a continuation of PCT International Application No. PCT/EP2017/071835, filed Aug. 31, 2017, which claims priority under 35 U.S.C. § 119 from German Patent Application No. 10 2016 220 383.5, filed Oct. 18, 2016, the entire disclosures of which are herein expressly incorporated by reference.

BACKGROUND AND SUMMARY OF THE INVENTION

The invention relates to a scooter with a foot rest arrangement.

For motorcycles or motorcycle-like vehicles, such as two or more-wheeled scooters (in the following also referred to as motorized scooters or merely scooters), different versions of foot rests are known to offer the driver the possibility of a secure and comfortable footing during travel.

Small foot rests that are laterally attached to the vehicle and can be folded out when in use are mostly employed for motorcycles.

By contrast, a comparatively large foot rest for the feet of the driver is available in the case of motorized scooters, which foot rest is usually arranged almost parallel or slightly angled relative to the road surface. This foot rest is located between a handlebar region and a driver's seat or is laterally integrated on the motorized scooter. A corresponding arrangement is known, for example, from DE 196 29 879 A1.

Such foot rest surfaces however have the characteristic that they are ergonomically suitable only for an upright or forward-leaning sitting position of the driver and require a correspondingly perpendicular or at least approximately perpendicular positioning of the lower legs of the driver regarding a vehicle longitudinal direction. However, these geometrical configurations can only be fulfilled for drivers of medium stature. By contrast, the ergonomical utilization of the vehicle is negatively affected in the case of very large or very small drivers.

A foot rest arrangement for both a driver and also a passenger is also known from DE 699 285 94 T2. The same extends between the handlebar region and a rear wheel region with a height that rises in this direction so that an ergonomical sitting position is difficult to realize.

In addition to the ergonomical aspects, the arrangement and embodiment of the foot rest fundamentally plays a safety-relevant part. Accordingly, the driver for stopping the vehicle has to initially lift the feet off the foot rest and try to make contact with the ground laterally to the foot rest in order to support the feet. Depending on body height of the driver and size of the foot rests, this can mean that the driver touches the road surface merely with the tips of his toes and stability is thus substantially restricted. In addition there is the risk that when tilting the vehicle, the foot of the driver is trapped between the road surface and the foot rest.

The mentioned disadvantages are likewise relevant in motorized scooters or scooters which have a sitting arrangement in which the seat and the sitting position are already designed for improved ergonomics. These also include, in particular, corresponding vehicles which are equipped with a "decoupled" steering arrangement. With these vehicles, a steerable front wheel guide is rotatably mounted about a first axis of rotation and a steering column rotatable about a second axis of rotation, wherein the steering column and the front wheel guide are arranged spaced from one another. Shown differently, the first and the second axis of rotation are thus orientated non-coaxially. A transmission of a steering movement is effected via a transmission means which connects the steering column with the front wheel guide in an operatively coupled manner.

An object of the invention therefore is to create a foot rest arrangement with which the mentioned disadvantages can be at least partly reduced, in particular to create as ergonomical as possible a foot rest arrangement for a motorized vehicle, such as a scooter with "decoupled" steering.

This and other objects are achieved with a motorized scooter or scooter in accordance with embodiments of the invention.

Accordingly, a scooter is provided, having a foot rest arrangement comprising a left foot rest surface and a right foot rest surface, and having a steerable front wheel guide which is rotatably mounted in a head tube about a first axis of rotation, and a steering column that is rotatable about a second axis of rotation, wherein the steering column and the front wheel guide are arranged spaced from one another and are operatively coupled to one another for transmitting a steering movement. The second axis of rotation intersects the foot rest arrangement at an intersection point in such a way that the left and right foot rest surfaces are each arranged laterally with respect to the intersection point.

The scooter thus has a "decoupled" steering arrangement, with which the first axis of rotation of the front wheel guide is arranged non-coaxially relative to the second axis of rotation of the steering column. For example, in contrast with usual, direct steering arrangements of known motorized scooters, this steering arrangement offers the fundamental possibility of defining a wheel base of the scooter and thus a sitting position of the driver to suit requirement. In particular, the wheel base can be selected to be longer than in comparison with usual steering arrangements of known motorized scooters, as a result of which a vehicle concept with a particularly ergonomical and yet safe sitting position for the driver can be provided. The driver can assume an upright or even a (viewed in vehicle longitudinal direction or travelling direction) reclined sitting position. In order to securely support the feet of the driver during this, the two foot rest surfaces are provided in the region of the intersection point. In the process, their arrangement laterally (i.e. left or right) regarding the second axis of rotation, i.e. the axis of rotation of the steering column, makes possible a particularly advantageous, ergonomical sitting position.

The second axis of rotation defines a straight line which intercepts the foot rest arrangement or a surface of the foot rest arrangement in the point of intersection. To both sides of the point of intersection, based on a vehicle longitudinal direction, left and right of the point of intersection, the left and the right foot rest surfaces are arranged respectively. The point of intersection can be defined by the second axis of rotation either purely virtually or as an actual point of intersection of a mounting rotatably receiving the steering column, for example of a tube section of a vehicle structure. In the case of the tube section, the same can be connected to the foot rest arrangement and extend away from the same in order to rotatably receive the steering column or the handlebar at a distal end.

At any rate it is ensured that the two foot rest surfaces or the entire foot rest arrangement are located behind the head tube of the scooter.

According to preferred embodiments, the first and second axes of rotation are orientated spaced parallel from one another or crossing one another.

Furthermore, the foot rest arrangement in a first section can be configured extending from the point of intersection in the direction of the head tube, in particular, the foot rest arrangement with a front end can be connected to the head tube. Accordingly, at least the first section of the foot rest arrangement is arranged between the point of intersection and the head tube, and thus substantially in front of the handlebar. The optional connection of the foot rest arrangement with the head tube makes possible a particularly large or long configuration of the foot rest arrangement including the left and right foot rest surfaces as a function of the distance of the head tube from the point of intersection. With the help of the elongated foot rest arrangement provided in this manner, a particularly advantageous, free positioning of feet is possible for greatly differing driver statures even with the sitting position remaining the same.

Alternatively or in addition, the foot rest arrangement in a second section can extend from the point of intersection in the direction of a vehicle rear of the scooter. Accordingly, the foot rest arrangement or the left and right foot rest surfaces of the same can be expanded in the vehicle longitudinal direction in the direction of the vehicle rear, i.e. against the travelling direction. This means that the second section merely extends in the direction of the vehicle rear or as far as to the vehicle rear.

In any case, an elongated foot rest arrangement is provided in this manner which makes possible a free positioning of the driver's foot. In conjunction with the optional first section, this is additionally improved once again.

According to a further preferred embodiment, the first section of the foot rest arrangement is arranged tilted by a first angle and/or the second section of the foot rest arrangement by a second angle regarding the vehicle longitudinal direction of the same or regarding the travelling direction. Thus, either the first section or the second section (or both) can be orientated jointly tilted relative to a road surface or relative to the vehicle longitudinal direction. Moreover, the first angle and the second angle can be selected to be identical or different in size, in particular the first angle can be greater than the second angle so that the first section has a greater inclination than the second section.

With the help of the tilted first and/or second section, increased ergonomics for the driver can be achieved on the one hand since the feet of the driver are not positioned parallel to the vehicle longitudinal axis or to a road surface. Instead, the inclination makes possible a flat and (at least partly) stretched positioning of the legs of the driver and thus a correspondingly deep and reclined sitting position of the driver, provided such is desired.

The respective angling however also results in that at least the first section as a protective shield is arranged behind the front wheel of the scooter as a result of which crash safety is significantly increased. In the case of a head-on crash, the front wheel is pushed against the first section, more precisely against the lower side of the same and deflected in the direction of the road surface or under the vehicle. With suitable strength, the foot rest arrangement prevents a further movement of the front wheel in the direction of the driver and his legs. A risk of injury is thus clearly reduced. In addition, the first section and/or the second section can also act as dirt deflectors against swirled-up dirt during normal operation.

Furthermore, the left and the right foot rest surface can be connected to one another in order to define a common rest surface of the foot rest arrangement.

Furthermore, the point of intersection with respect to the vehicle longitudinal direction and/or with respect to a vehicle transverse direction of the scooter can be substantially arranged in the middle of the common rest surface. By way of this it is ensured that the steering column in its extension (which is defined by the second axis of rotation) is arranged in the middle above the common rest surface. This arrangement offers a particular flexibility for a wide range of driver body heights without special adjusting devices for the individual geometry change on the vehicle, such as for example a handlebar adjustment, having to be provided.

In addition, a vehicle structure following a rear end of the foot rest arrangement can have a smaller width than a maximum width of the foot rest arrangement. This means that the foot rest arrangement, at least at its widest point (i.e. at the point of maximum width) has a greater width than the vehicle structure that is arranged behind the foot rest arrangement. Thus, when the driver takes his feet off the foot rest surfaces, he can laterally rest the feet in the region of the vehicle structure arranged behind the foot rest arrangement. Because of the smaller width of the vehicle structure, the feet can be positioned near the vehicle as a result of which the driver retains a secure footing, in contrast with a footing on tiptoes that is usual with motorized scooters because of the greater width of the vehicle and of its foot rests. In addition, the driver can reach the road in a very short time in that he simply retracts his feet to the back off the foot rest surfaces, lowering them in the direction of the road surface in order to prevent for example falling-over.

Should a lateral falling-over of the scooter occur despite this, the described foot rest arrangement, because of its greater width, offers the advantage that the same acts as crash bar. When the scooter lies on one of its vehicle sides, a safe free space or protected space remains for the foot and the leg of the driver in the region of the narrower vehicle structure so that trapping of the foot or of the calf in this region can be prevented.

According to one embodiment, the foot rest arrangement comprises a tubular frame arrangement which forms at least one lateral enclosure of the foot rest arrangement, in particular of the left and/or right foot rest surfaces. Such a tubular frame arrangement offers an additional stability for the entire foot rest arrangement and can accordingly act as a protection or crash bar. Preferentially, the tubular frame arrangement laterally encloses the two foot rest surfaces in order to protect these from damage and create and retain if required the described protective space.

In addition, the tubular frame arrangement can have a left or a right tube element which are each connected to one another with a front end in the region of the head tube and/or to the head tube.

In addition, the left and the right tube element can each have a rear end which is connected to the vehicle structure of the scooter. The two tube elements thus constitute an extension of the vehicle structure into the foot rest arrangement or connect the vehicle structure and the foot rest arrangement with one another. Preferentially, a vehicle frame defining the vehicle structure and at least the two tube elements or the entire tubular frame arrangement are joined in one piece to form a common component.

Furthermore, the scooter can preferably be a two-wheeled, three-wheeled or four-wheeled scooter.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
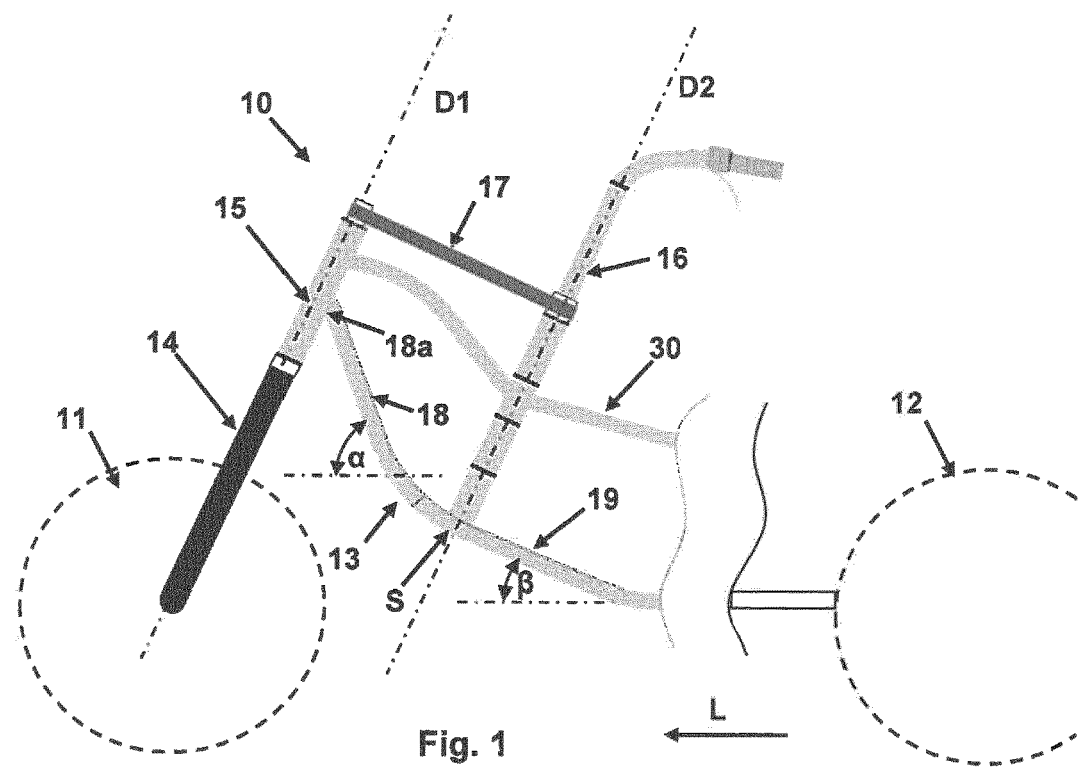
FIG. 1 is a partial lateral view of a scooter according to the description.

In FIG. 1, a merely partial and schematic lateral view of a scooter 10 is shown, wherein the positions of a front wheel 11 and of a rear wheel 12 are merely schematically suggested. The scooter 10 can, for example, be a two-wheeled, three-wheeled or four-wheeled scooter.

In each case, the scooter 10 has a "decoupled" steering arrangement, with which a steerable front wheel guide 14 defines a suspension and guide of the front wheel 11. The steerable front wheel guide 14 is rotatably mounted about a first axis of rotation D1 in a vehicle-fixed head tube 15. In addition, the steering arrangement includes a steering column 16 that is rotatable about a second axis of rotation D2, wherein the front wheel guide 14 and the steering column 16 are arranged spaced from one another. For transmitting a steering movement, the steering column 16 is connected in an operatively coupled manner to the front wheel guide 14 by a transmission 17.

In addition, the scooter 10 includes a foot rest arrangement 13 which comprises a left foot rest surface 13a and a right foot rest surface 13b. For achieving particularly advantageous ergonomics and safety, the foot rest arrangement 13 is arranged in such a manner that the second axis of rotation D2 intersects the foot rest arrangement 13 at an intersection point S and the left 13a and right foot rest surface 13b are each arranged laterally to the point of intersection S as is shown in particular in FIG. 2.

In this embodiment, the first axis of rotation D1 and second axis of rotation D2 are thus not coaxially orientated relative to one another. Here, they are orientated parallel and spaced from one another. Alternatively, an orientation crossing one another is likewise possible (not shown).

Furthermore, the foot rest arrangement 13 extends in a first, front section 18 from the point of intersection S in the direction of the head tube 15. The first section 18 is thus positioned in a region between the head tube 15 and the second axis of rotation D2 or the point of intersection S. In addition, the foot rest arrangement 13 is connected at a front end 18a to the head tube 15 so that the foot rest arrangement 13 is a load-bearing element of an entire vehicle structure 30, such as for example a vehicle frame.

In addition, the foot rest arrangement 13 has a second section 19 which extends at least partly from the point of intersection S in the direction of a vehicle rear of the scooter 10, i.e. in the direction of the rear axle.

In the embodiment shown, the first section 18 of the foot rest arrangement 13 is arranged tilted by a first angle $\alpha$ and the second section 19 of the foot rest arrangement 13 by a second angle $\beta$ relative to a vehicle longitudinal direction L.

Figure 2:
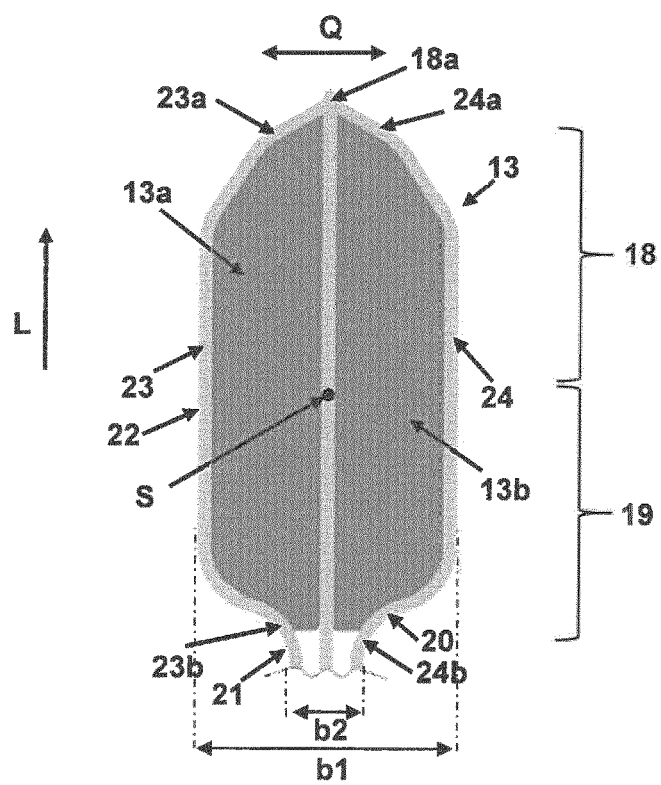
FIG. 2 is a plan view of a foot rest arrangement according to the description.

As shown in FIG. 2, the left 13a and the right foot rest surface 13b are connected to one another and define a common rest surface of the foot rest arrangement 13.

According to FIG. 2, the point of intersection S is arranged with respect to the vehicle longitudinal direction L and with respect to a vehicle transverse direction Q of the scooter substantially in the middle of the common rest surface of the foot rest arrangement 13. In addition, the foot rest arrangement 13 is configured in such a manner that a vehicle structure 21 following a rear end 20 of the foot rest arrangement 13 has a smaller width b2 than the foot rest arrangement 13, with a maximum width b1.

Furthermore, the foot rest arrangement 13 has a tubular frame arrangement 22 which forms at least one lateral enclosure of the foot rest arrangement 13, in particular of the left 13a and/or right foot rest surface 13b. The tubular frame arrangement 22 thus forms a protective frame of the foot rest arrangement 13. To this end, the tubular frame arrangement 22 has a left 23 and a right tube element 24, which are each connected with a front end 23a, 24a to the head tube 15.

In addition, the left 23 and the right tube element 24 each have a rear end 23b, 24b which is connected to the vehicle structure 21 of the scooter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A scooter with a foot rest arrangement, comprising:
    a left foot rest surface and a right foot rest surface;
    a steerable front wheel guide, which is rotatably mounted in a head tube about a first axis of rotation; and
    a steering column that is rotatable about a second axis of rotation,
    wherein
        the steering column and the front wheel guide are spaced from one another and are operatively coupled to one another for transmitting a steering movement,
        the second axis of rotation intersects the foot rest arrangement at an intersection point such that the left and right foot rest surfaces are each arranged laterally to the intersection point, and
        a vehicle structure following a rear end of the foot rest arrangement has a smaller second width than a maximum first width of the foot rest arrangement.

2. The scooter as claimed in claim 1, wherein
    the first and the second axes of rotation are orientated spaced from one another.

3. The scooter as claimed in claim 1, wherein
    the foot rest arrangement in a first section is configured extending from the intersection point in the direction of toward the head tube.

4. The scooter as claimed in claim 3, wherein
    the foot rest arrangement with a front end is connected to the head tube.

5. The scooter as claimed in claim 3, wherein
    the foot rest arrangement in a second section extends from the intersection point toward a rear of the scooter.

6. The scooter as claimed in claim 5, wherein
    the first section of the foot rest arrangement is tilted by a first angle and/or the second section of the foot rest arrangement by a second angle relative to a vehicle longitudinal direction.

7. The scooter as claimed in claim 1, wherein
    the left and the right foot rest surfaces are connected to one another in order to define a common rest surface of the foot rest arrangement.

8. The scooter as claimed in claim 6, wherein
the left and the right foot rest surfaces are connected to one another in order to define a common rest surface of the foot rest arrangement.
9. The scooter as claimed in claim 7, wherein
the intersection point with respect to a vehicle longitudinal direction and/or with respect to a vehicle transverse direction of the scooter is substantially arranged in a middle of the common rest surface.
10. The scooter as claimed in claim 1, wherein
the foot rest arrangement comprises a tubular frame arrangement which forms at least one lateral enclosure of the foot rest arrangement.
11. The scooter as claimed in claim 10, wherein
the at least one lateral enclosure is of the left and/or right foot rest surface.
12. The scooter as claimed in claim 10, wherein
the tubular frame arrangement comprises a left and a right tube element which are each connected to one another with a front end in a region of the head tube and/or to the head tube.
13. The scooter as claimed in claim 12, wherein
the left and the right tube element each have a rear end which is connected to a vehicle structure of the scooter.
14. The scooter as claimed in claim 1, wherein
the scooter is a two-wheeled, three-wheeled or four-wheeled scooter.

* * * * *